(12) United States Patent
Bertken

(10) Patent No.: US 8,186,512 B2
(45) Date of Patent: May 29, 2012

(54) LOW WASTE PACKAGING

(75) Inventor: Dennis Bertken, Solana Beach, CA (US)

(73) Assignee: Life+Gear, Inc., Del Mar, CA (US)

( * ) Notice: Subject to any disclaimer, the term of this patent is extended or adjusted under 35 U.S.C. 154(b) by 274 days.

(21) Appl. No.: 12/634,631

(22) Filed: Dec. 9, 2009

(65) Prior Publication Data
US 2011/0132787 A1 Jun. 9, 2011

(51) Int. Cl.
*B65D 73/00* (2006.01)
(52) U.S. Cl. .................. 206/461; 206/488; 206/806
(58) Field of Classification Search .................. 206/349, 206/376, 379, 461, 467, 468, 459.5, 495, 206/483, 487, 488, 806, 807; 211/70.6; 248/309.1, 248/313, 315, 317, 316.1, 318, 346.03, 346.04, 248/688, 689
See application file for complete search history.

(56) References Cited

U.S. PATENT DOCUMENTS

| | | | | | |
|---|---|---|---|---|---|
| 3,698,551 | A | * | 10/1972 | Tomlinson | 206/489 |
| 3,908,827 | A | * | 9/1975 | Bemmels et al. | 206/478 |
| 3,927,765 | A | * | 12/1975 | Beal | 206/495 |
| 5,906,350 | A | * | 5/1999 | Kao | 206/349 |
| 6,241,208 | B1 | * | 6/2001 | Lin | 206/349 |
| 7,360,651 | B2 | * | 4/2008 | Kuo | 206/376 |
| 2007/0007154 | A1 | * | 1/2007 | Wu | 206/349 |

* cited by examiner

*Primary Examiner* — Luan K Bui
(74) *Attorney, Agent, or Firm* — Marger Johnson & McCollom, P.C.

(57) ABSTRACT

Low waste packaging for use with a consumer product includes a planar tag element of a generally rectangular configuration having front and back planar surfaces upon which advertising indicia may be printed and a cut-out into which a portion of the consumer product is received. The packaging includes first and second semi-annular ring portions that may be assembled around the consumer product when received within the cut-out and affixed to each other through the planar tag element. The method for packaging a consumer product includes receiving the consumer product within a cutout formed in a lower portion of a planar tag element; and assembling two halves of a retaining member about an upper shank of the consumer product so that annular portions of the retaining members contact the consumer product and laterally extensive tags of the retaining members sandwich the tag therebetween.

15 Claims, 2 Drawing Sheets

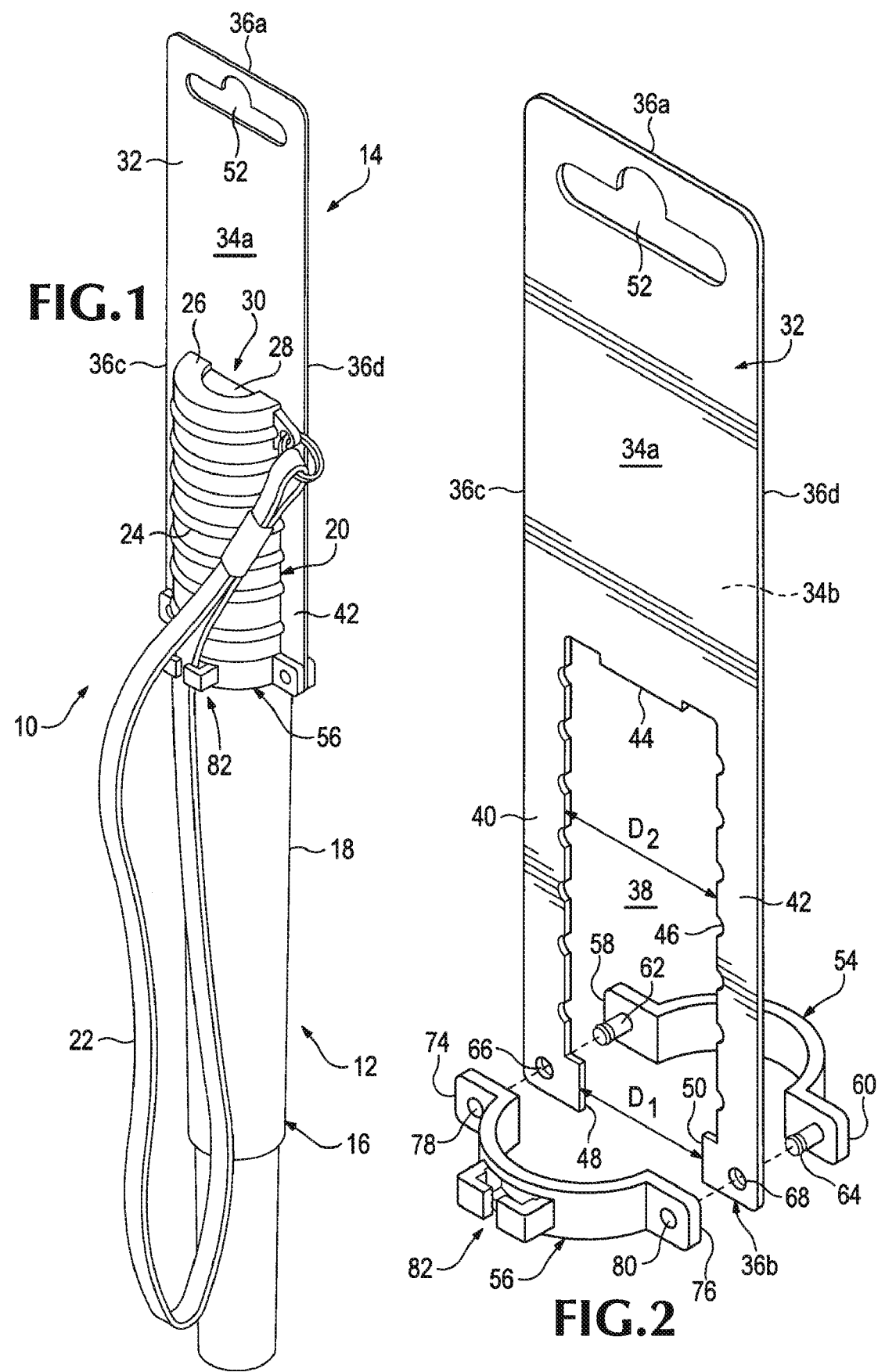

LOW WASTE PACKAGING

BACKGROUND OF THE INVENTION

This invention relates generally to packaging and more particularly to methods and package configurations that allow greater accessibility to a product being packaged while minimizing waste when the packaging is removed and thrown away.

Packaging of consumer products typically fulfills many purposes, including providing information about the product, protecting the product during shipping, providing security to prevent the product from being shoplifted, and improving its ability for being displayed in a retail environment.

Common types of packaging for consumer products such as flashlights include plastic blister packaging where two shells of a clear plastic material are formed around a product and sealed along a periphery to join the two shells. Removal of the packaging is difficult because it often requires scissors and can result in sharp edges where cut. Furthermore, such packaging results in much waste, is often unrecyclable, and adds bulk during shipping. Additionally, such blister packages prevent access to the device so that the product may not be tried out, and is very unsustainable.

Accordingly, a better packaging scheme is desired that strikes a proper balance of the needs of the retailer while limiting waste.

SUMMARY OF THE INVENTION

Low waste packaging for use with a consumer product includes a planar tag element of a generally rectangular configuration having front and back planar surfaces upon which advertising indicia may be printed and a cut-out into which a portion of the consumer product is received. The packaging includes first and second semi-annular ring portions that may be assembled around the consumer product when received within the cut-out and affixed to each other through the planar tag element. The method for packaging a consumer product includes receiving the consumer product within a cutout formed in a lower portion of a planar tag element; and assembling two halves of a retaining member about an upper shank of the consumer product so that annular portions of the retaining members contact the consumer product and laterally extensive tags of the retaining members sandwich the tag therebetween.

In a general aspect of the invention, low waste packaging for use with a consumer product includes a planar tag element having a cut-out defined therein into which at least a portion of a consumer product is configured to be received. The packaging further includes a retaining member having at least a first part and a second part configured to be assembled about a portion of the received portion and sandwich a part of the planar tag element therebetween.

The first and second part of the retaining member may include semi-annular portions and laterally-extensive flange portions, said semi-annular portions configured to contact the consumer product and said laterally-extensive flange portions contacting and sandwiching the planar tag element.

The flange portions of the first part of the retaining member may include posts extending perpendicularly from a flange surface, the flange portion of the second part of the retaining member including apertures through which the posts are received when the retaining member is assembled.

The cut-out may have a first width to accommodate a portion of the consumer product having the same width, and an inside surface of the retaining member having a second width less than the first width The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 1 is a perspective view of packaging configured according to a preferred embodiment of the invention used about an exemplary consumer product FIG. 2 is an exploded perspective view of the packaging of FIG. 1.

DETAILED DESCRIPTION

Figure 3:
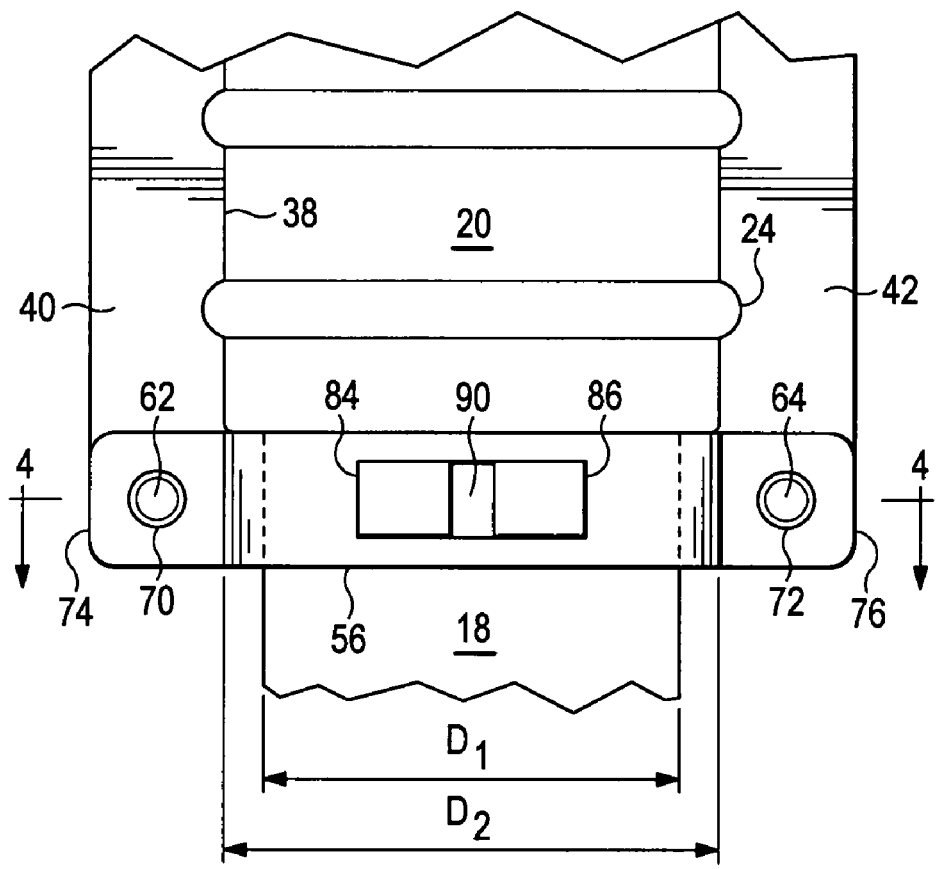
FIG. 3 is a side elevation view of a portion of the packaging about the consumer product of FIG. 1.

FIG. 1 illustrates in perspective a retail assembly 10 including a consumer product, shown as flashlight 12, captured and retained within low-waste retail packaging 14 of the type contemplated in the invention and described further below.

Flashlight 12 is characterized by an elongate body 16 with a lower barrel 18 of a first diameter $D_1$ and an upper portion 20 of a second, greater diameter $D_2$. Flashlight 12 further includes a wrist strap 22 affixed to the upper portion 20 of the flashlight. The upper portion 20 of the flashlight 12 includes a plurality of annular ribs—such as ribs 24—formed on the annular walls 26 of the upper portion 20 and that extend around the outside diameter of the annular walls. These ribs 24 are accommodated within the packaging as noted below. A light (not shown) of the flashlight is configured to shine through a transparent element 28 on an upper end of the flashlight, with transparent element 28 being captured within the annular walls 26 so that it forms a depression 30 with respect to the inner diameter of the annular walls. In general, however, the invention is adapted to operate best when the end of the consumer product captured within the packaging 14 has a greater dimension (e.g. diameter) than the remaining portion of the consumer product.

FIG. 2 illustrates in perspective low waste retail packaging 14 of the type constructed according to a preferred embodiment of the invention. Packaging 14 includes a planar tag element body 32 having front and back planar surfaces 34a, 34b upon which advertising indicia may be printed. The body 32 of the planar tag element is bounded by top 36a, bottom 36b and side edges 36c, 36d, in a generally rectangular configuration, and can be formed of a semi-rigid plastic or the like. A shaped cut-out 38 is defined through the bottom edge 36b and extends into the body 32 of the planar tag element so that side portions 40, 42 of the planar tag element remain, whereby the side portions 40, 42 are bounded by the side edges 36c, 36d and cut-out 38.

The cut-out 38 is sized and shaped to receive and retain an upper portion 20 of a consumer product. The cut-out 38 includes a downwardly-directed tab 44 formed on an upper section of the cut-out, where tab 44 is configured to be received within the depression 30 formed between the annular walls 26 of the consumer product 12. The extent of tab 44 is substantially similar to the inner diameter of the annular walls and the height is similar to the depth of depression 30 so that the tab 44 frictionally engages with a top portion of the consumer product 12 and thereby holds the upper portion 20 of the consumer product in place within the cut-out. Shaped portions 46 may also be formed within cut-out 38 to accept complementary shaped portions—e.g. annular ribs 24—formed on the outside walls 26 of the flashlight 12 upper portion 20.

The cut-out 38 is further defined by inwardly-directed tabs 48, 50 formed at a lower portion of the planar tag element 32. Tabs 48, 50 extend into the lower opening of cut-out 38 through which the lower barrel 18 of the consumer product extends downward. Accordingly, a distance between tabs 48, 50 is preferably substantially similar to the diameter $D_1$ of the lower barrel 18 in contrast with the greater diameter $D_2$ of the main portion of cutout 38. In this configuration, and as will be appreciated below, the annular walls 26 of the upper portion 20 of the consumer product can then rest upon these tabs 48, 50 (and supporting structure as described below) and thus assist in retaining the upper portion within the cut-out 38.

The planar tag element 32 may include a hanging structure located on an upper portion of the planar tag element. In a preferred implementation of the packaging 14, the hanging structure is an aperture 52 formed through the planar tag element 32 and from which the packaging can be hung as from a peg-board in a retail environment.

Figure 4:
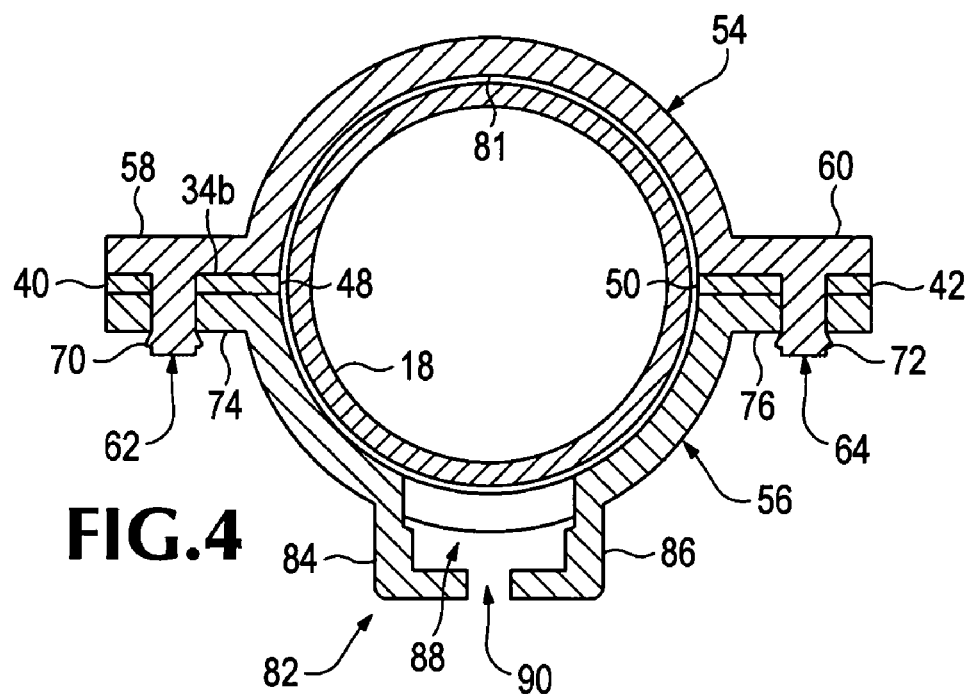
FIG. 4 is a sectional view taken along lines 4-4 of FIG. 3.

FIGS. 3 and 4 illustrate best the inventive methods for affixing the packaging 14 to the consumer product 12. The methods for affixing include first and second semi-annular ring portions 54, 56 that are assembled about a portion of the product 12.

In a preferred embodiment, the first semi-annular ring portion 54 includes flanges 58, 60 extending oppositely at terminal portions of the first semi-annular ring. Posts 62, 64 are affixed at each of the terminal portions and extend generally perpendicularly from the flanges and parallel to one another. These posts 62, 64 are received within apertures 66, 68 formed to either side of the cut-out 38—adjacent tabs 48, 50 at the bottom edge 36b of the tag element 32—where each of said posts include a coupling member 70, 72 located at the terminal ends of the posts. In a preferred embodiment, the coupling member, e.g. member 70, has a larger cross-section than a cross-section of the respective post, e.g. post 62.

The second semi-annular ring portion 56, like the first 54, includes flanges 74, 76 extending oppositely at terminal portions of the second semi-annular ring. Each of the flanges 74, 76 of the second semi-annular ring include an aperture 78, 80 formed therethrough, wherein the apertures 78, 80 on the second-annular ring 56 are spaced apart a distance equal to a distance between the posts 62, 64 and a distance between the apertures 66, 68 formed through the planar tag element 32 on either side of the cut-out 38 so that the apertures and posts may be axially aligned when the packaging 14 is assembled around the consumer product and the upper portion 20 of the product 12 captured within the cut-out 38 and between the first and second semi-annular ring portions 54, 56.

The posts 62, 64 each has a circular cross-section of a designated diameter, wherein the apertures—e.g. tag apertures 66, 68 and ring apertures 78, 80—into which the posts are received have a substantially similar diameter, and wherein the coupling members 70, 72 formed at the terminal end of the posts 62, 64 have a larger diameter. Coupling members 70, 72, the apertures 66, 68, 78, 80, or all are of sufficient resiliency such that the larger diameter coupling members 70, 72 may be forced and snap through the apertures and prevent easy removal. Furthermore, to ensure a tight fit using the coupling members 70, 72, the distance from a base of the posts 62, 64 to a proximal end of the coupling member is substantially equal to a combined thickness of the apertures 66, 68 on the planar tag element 32 through which the posts are received and the tabs 74, 76 on the second semi-annular ring portion 56.

In a preferred embodiment, the semi-annular rings 54, 56 include an inner diameter $D_1$ of an inner wall 81 that is less than a greater width $D_2$ of the cut-out.

Further, the second semi-annular ring may include a strap-holder 82 formed on an outside wall of the semi-annular ring 56. The strap-holder 82 may include a pair of L-shaped flanges 84, 86 facing each other and forming a strap-retaining aperture 88 therebetween, said flanges being spaced apart to form a gap 90 therebetween through which the strap 22 is received and retained within the aperture 88.

The invention also includes methods for packaging a consumer product. The method comprises receiving the consumer product 12 within a cutout 38 formed in a lower portion of a planar tag element. Two halves 54, 56 of a retaining member are affixed about an upper shank 20 of the consumer product 12 so that annular portions of the retaining members contact the consumer product and laterally extensive flanges 58, 60, 74, 76 of the retaining members 54, 56 sandwich the tag therebetween.

The method further includes coupling the flanges 58, 60, 74, 76 of the retaining member together using posts 62, 64 that pass through co-axial holes 66, 68, 78, 80 formed through the planar tag and at least one 56 of the two halves of the retaining member. The method further includes retaining a depression 30 within an upper surface of the consumer product with a complementary tab 44 formed in the cut-out.

One will appreciate that the low-waste packaging described above and shown in the drawings leaves a majority of the consumer product accessible so that it may be handled and tried out prior to purchase. Furthermore, the retaining members 54, 56 may be easily pried apart without using tools and the product removed—which is in stark contrast with blister packaging in which sharp scissors and a steady hand are required for extricating the product from the packaging without damage to self or the product itself. Finally, the packing itself is extremely low profile and relatively light-weight so that the product may be shipped with efficiency and low cost.

Having described and illustrated the principles of the invention in a preferred embodiment thereof, it should be apparent that the invention can be modified in arrangement and detail without departing from such principles. For instance, the cut-out shape and that of the retaining member are dependent upon the size and shape of the consumer product and need not include annular surfaces or the like. We therefore claim all modifications and variation coming within the spirit and scope of the following claims.

What is claimed is:

1. Low waste packaging for use with a consumer product, comprising:
   a planar tag element having front and back planar surfaces upon which advertising indicia may be printed, a body of the planar tag element being bounded by top, bottom and side edges;
   a shaped cut-out defined through the bottom edge and extending into the body of the planar tag element so that side portions of the planar tag element remain, said side portions defined between the side edges and cut-out and said shaped cut-out being configured to receive and retain an upper portion of a consumer product;
   apertures formed through the planar tag element on either side of the cut-out adjacent the bottom edge of the tag element;

a first semi-annular ring portion having flanges extending oppositely at terminal portions of the first semi-annular ring;

posts affixed at each of the terminal portions extending generally perpendicularly from the flanges and parallel to one another and received within the apertures formed to either side of the cut-out, each of said posts having a coupling member located at a terminal end of the posts; and a second semi-annular ring portion having flanges extending oppositely at terminal portions of the second semi-annular ring, each of the flanges of the second semi-annular ring having an aperture formed therethrough, wherein the apertures on the second-annular ring are spaced apart a distance equal to a distance between the posts and a distance between the apertures formed through the planar tag on either side of the cut-out so that the apertures and posts may be axially aligned when the packaging is assembled around the consumer product and an upper end of the product captured within the cut-out and between the first and second semi-annular ring portions.

2. The packaging of claim 1, further including a hanging structure located on an upper portion of the planar tag element.

3. The packaging of claim 2, wherein the hanging structure is an aperture formed through the planar tag element and from which the packaging can be hung.

4. The packaging of claim 1, wherein the cut-out includes a downwardly-directed tab formed on an upper section of the cut-out, the tab being configured to be received between annular walls of a product having a substantially similar inner diameter to thereby hold an upper portion of the consumer product in place within the cut-out.

5. The packaging of claim 4, wherein the semi-annular rings include an inner diameter that is less than a greater width of the cut-out.

6. The packaging of claim 1, wherein the second semi-annular ring includes a strap-holder formed on an outside wall of the semi-annular ring.

7. The packaging of claim 6, wherein the strap-holder includes a pair of L-shaped flanges facing each other and forming a strap-retaining aperture therebetween, said flanges being spaced apart to form a gap therebetween through which the strap is received and retained within the aperture.

8. The packaging of claim 1, wherein the coupling member has a larger cross-section than a cross-section of the post.

9. The packaging of claim 8, wherein the post has a circular cross-section of a designated diameter, wherein the apertures into which the post is received has a substantially similar diameter, and wherein the coupling member formed at the terminal end of the post has a larger diameter.

10. The packaging of claim 1, wherein the distance from a base of the post to a proximal end of the coupling member is substantially equal to a combined thickness of the aperture on the planar tag element through which the post is received and the tab on the second semi-annular ring portion.

11. The packaging of claim 1, further including inwardly-directed tabs formed at a lower portion of the planar tag element extending into the cut-out.

12. Low waste packaging for use with a consumer product, comprising:

a planar tag element having a cut-out defined therein into which at least a portion of a consumer product is configured to be received; and a retaining member having at least a first part and a second part each spanning across the cut-out and configured to be assembled about the portion of the consumer product configured to be received in the cut-out and sandwich a part of the planar tag element therebetween, wherein the cut-out includes a downwardly-directed tab formed on an upper section of the cut-out, the tab being configured to be received between annular walls of a product having a substantially similar inner diameter to thereby hold an upper portion of the consumer product in place within the cut-out.

13. The low waste packaging of claim 12, wherein the first and second parts of the retaining member include semi-annular portions and laterally-extensive flange portions, said semi-annular portions configured to contact the consumer product and said laterally-extensive flange portions contacting and sandwiching the planar tag element.

14. The low waste packaging of claim 13, wherein the flange portions of the first part of the retaining member include posts extending perpendicularly from a flange surface, the flange portion of the second part of the retaining member including apertures through which the posts are received when the retaining member is assembled.

15. The low waste packaging of claim 12, wherein the cut-out has a first width to accommodate a portion of the consumer product having the same width, and an inside surface of the retaining member having a second width less than the first width.

* * * * *